United States Patent [19]

Rivin

[11] Patent Number: 5,595,540
[45] Date of Patent: Jan. 21, 1997

[54] TORSIONALLY RIGID MISALIGNMENT COMPENSATING COUPLING

[76] Inventor: Evgeny I. Rivin, 30236 Southfield Rd., #249, Southfield, Mich. 48076

[21] Appl. No.: 366,462

[22] Filed: Dec. 30, 1994

[51] Int. Cl.⁶ .................................................. F16D 3/04
[52] U.S. Cl. .......................................... 464/85; 464/102
[58] Field of Search ........................... 464/51, 81, 82, 464/83, 85, 89, 150, 152, 102, 104, 94, 96

[56] References Cited

U.S. PATENT DOCUMENTS

| | | | |
|---|---|---|---|
| 1,029,355 | 6/1912 | Francke | 464/81 |
| 1,324,523 | 12/1919 | Serrell | 464/81 |
| 1,591,063 | 7/1926 | Smith | 464/81 |
| 1,595,864 | 8/1926 | Francke | 464/81 |
| 2,433,791 | 12/1947 | Smith | 464/104 X |
| 3,438,221 | 4/1969 | Paulsen | 464/104 X |
| 3,525,238 | 8/1970 | Cruz | 464/85 |
| 4,121,438 | 10/1978 | McCullough | 464/102 |
| 4,518,368 | 5/1985 | Peretti | 464/85 X |
| 4,917,653 | 4/1990 | Collucci | 464/85 |

FOREIGN PATENT DOCUMENTS

| | | | |
|---|---|---|---|
| 40-4124401 | 4/1992 | Japan | 464/102 |
| 40-6042473 | 2/1994 | Japan | 464/102 |

*Primary Examiner*—Daniel P. Stodola
*Assistant Examiner*—Eileen A. Dunn

[57] ABSTRACT

The torsional connection has two hubs attached to the input and output shafts and an intermediate member coaxially located between the hubs. Each hub is connected with the intermediate member by two diametrically disposed pairs of laminates composed of bonded together thin alternating layers of elastomeric (rubber—like) and rigid (e.g., metal) materials. Each pair is preloaded in compression. Diameters of the intermediate member along which the pairs of laminates connecting it with each hub are located, are perpendicular to each other. Torque transmitted through the connection is loading the laminates in compression, while radial misalignments between the connected shafts are compensated by shear deformations of the laminates. The laminated elements of each pair are located on opposite sides of a two-pronged holding structure whose prongs are expanded outwardly by a preload-generating element inside the holding structure. The same preload-generating elements tie the holding structure into a rigid frame for transmitting tangential force in the torsional connection.

10 Claims, 3 Drawing Sheets

5,595,540

TORSIONALLY RIGID MISALIGNMENT COMPENSATING COUPLING

FIELD OF THE INVENTION

The present invention relates to torsional connections (couplings) for mechanical power transmission.

BACKGROUND OF THE INVENTION

Mechanical power transmission systems are often built from several connected modules. Such modules can be an electric motor and a mechanical reducer, or a steam turbine and an electric generator, etc. The shafts of these modules are connected with couplings which are capable to transmit torque and rotational motion (torsional connections). In some cases, these torsional connections are rigidly attached to both connected shafts, and also have rigid structures ("rigid couplings"). However, if there are misalignments between the connected shafts (offset, angular misalignment, etc), use of rigid couplings results in undesirable alternating loads of significant magnitudes applied to both connected shafts and to their bearings. Since the misalignments are practically always present due to inaccuracies of assembling the modules, due to their different thermal expansion, due to deformations of the modules and their mounting systems under transmitted loads, due to sagging of foundations, etc., there is a need for torsional connections which are rigid in torsional direction (for torque transmission), but have a degree of mobility in the directions of possible misalignments between the connected shafts, from which an offset is often the most important one.

While widely used torsionally-flexible couplings (such as jaw coupling, tire coupling, etc.) always have some degree of misalignment-compensation ability, in many cases their use is restricted since high torsional stiffness of the connection is required. Gear couplings have high torsional stiffness, but are able to compensate only angular misalignments, thus two gear couplings connected by a rather long spacer are required for compensating offset misalignments. This approach, while frequently embraced, is expensive and requires a substantial space.

A very compact torsional connection which provides kinematic compensation for offset misalignment is Oldham coupling which consists of two hubs attached to the connected shafts and an intermediate member which is in a sliding engagement with these hubs. The intermediate member has projections on each face, which are located on each face along the same diameter. These diameters on two faces are perpendicular to each other. The projections have sliding engagements (on two sides of each projection) with corresponding slots on each hub. During rotation, the intermediate member slides in relation to both hubs, thus providing a theoretically ideal compensation of the offset misalignment between the connected shafts. In real life, performance of conventional Oldham couplings is far from ideal. Since the projections are sliding in their respective slots while loaded with high tangential forces due to torque transmission by the connection, high loads (friction forces) are still transmitted to the connected shafts and their bearings. Friction coefficients are high due to small dimensions of the sliding connections and ensuing high contact pressures, difficulties to supply lubrication, inevitable distortions of the contact conditions, etc. At small offset misalignments, compensation does not occur since the forces transmitted to the shafts do not exceed static friction forces and thus sliding does not commence. Oldham couplings are limited to low-speed applications due to the bad friction conditions. They have significant power transmission losses and, thus, heat generation, which forces designer to provide for clearances in the projection—slot sliding pairs. The resulting backlashes make such couplings (as well as gear couplings) very undesirable for applications in servo-controlled systems in which presence of backlashes hampers realization of the required control strategies. Also, due to presence of sliding at high contact pressures, conventional Oldham couplings have relatively large dimensions.

Thus, the prior art does not satisfy a need for a compact torsionally—rigid misalignment—compensating torsional connection (coupling) which can be used at high rpm, generate low loads on connected shafts and their bearings, perform at any, even very small., misalignments, and be free from backlash.

The present invention addresses the inadequacies of the prior art by providing a torsional connection which retains the kinematic structure of the Oldham coupling but does not have its design shortcomings. The proposed torsional connection is composed of two hubs, attached to the respective shafts, and a coaxial intermediate member connected with the hubs as in the Oldham coupling. However, instead of sliding connections between the hubs and the intermediate member which are characteristic for the conventional Oldham coupling, each sliding contact is replaced with a laminated element consisting of bonded together alternating, preferably thin, layers of elastomeric (rubber-like) and rigid (e.g., metal or composite) material which are accommodating tangential forces due to torque transmitted between the hubs and the intermediate member, in compression (i.e., in normal direction to the layers). The displacements between the hubs and the intermediate member which are compensating offset misalignments between the connected shafts are materializing through internal shear deformations in the laminated elements (instead of the sliding motions as in the conventional Oldham coupling). Since it is known (e.g., see E. Rivin, "Properties and Prospective Applications of Ultra-Thin Layered Rubber-Metal Laminates for Limited Travel Bearings", Tribology International, February 1983) that shear resistance of the laminated elements is only slightly dependent on its compression loading, and that compression stiffness of the laminated elements is fast increasing with increasing compression loading, the laminated elements in the present invention are preloaded in compression during assembly of the torsional connection. The preload is applied by means of elastic deformation of the laminate—holding structures, thus simplifying the assembly procedure. Each of the fork-like holding structures has two prongs contacting with the laminated elements. The prongs are simultaneously deflected outwardly by a preload—generating element moving inside the holding structure. After preloading is accomplished, the holding structure remains reinforced by the preload—generating element into a rigid and strong frame-like structure which then participates in torque transmission through the connection.

The preload allows to completely eliminate clearances/ backlashes in the torsional connection, and to significantly increase its torsional stiffness. These effects are achieved without a significant increase (or even with reduction) of the forces required to provide the misalignment—compensating effect and, accordingly, without increase in dissipation of the transmitted energy in the torsional connection.

Use of internal shear deformation instead of sliding friction makes the torsional connection sensitive to misalignment of any magnitude, even very small. Since no heavily loaded frictional contacts are used, material specifications to major structural components of the torsional connection (the hubs and the intermediate member) can be relaxed since only their bulk strength and not contact endurance is required. Accordingly, light and strong advanced materials (such as aluminum, fiber-reinforced composites, etc) can be used for the torsional connection, thus reducing its weight and centrifugal forces at high rpm. It was also shown (e.g., in the cited above article) that the laminated elements can tolerate much higher specific loads for limited travel applications than the sliding contacts. This results in a smaller size of the torsional connection described in the present invention than the size of a conventional Oldham coupling for the same payload capacity.

SUMMARY OF THE INVENTION

The present invention provides a torsional connection for transmitting mechanical power designed to utilize extreme anisotropy of properties of laminated elements made of alternating thin layers of elastomeric and rigid materials at compression and shear loading. The connection includes two hubs attached to the shafts being connected, and an intermediate member coaxial with these hubs. Each hub is connected with the intermediate member by two pairs of the laminated elements installed in such a way that tangential forces representing torque transmitted between the hubs and the intermediate member are loading the laminated elements in compression, while relative displacements between the hubs and the intermediate member can be realized by means of shear deformation of the laminated elements. Two pairs of the laminated elements in the interfaces between each hub and the intermediate member are located symmetrically in relation to planes containing the axis of the connection. Two planes, associated with each interface, are mutually perpendicular. Each of the four pairs of the laminated elements is preloaded in compression. The preload is applied by an elastic deformation of the structural components holding the laminated elements. These holding structures can be attached either to the hubs or to the intermediate member. Use of internal shear deformation of the laminated elements instead of sliding in highly loaded friction joints allows to enhance load—carrying capacity of the connection for a given size; to reduce energy dissipation in the torsional connection; to eliminate need in lubrication; to enable use of light and strong advanced materials for structural parts thus reducing weight of the connection; to reduce noise generated by the connection; to reduce loads transmitted to the connected shafts and their bearings; to assure misalignment compensation even for the small and very small misalignments. Compression preload of the laminated elements allows to increase torsional stiffness of the connection without significantly affecting its stiffness in the compensation direction, and to eliminate backlash in the power-transmission system.

BRIEF DESCRIPTION OF THE DRAWINGS

The present invention can best be understood with reference to the following detailed description and drawings in which.

DETAILED DESCRIPTION OF THE PREFERRED EMBODIMENTS

Figure 1:
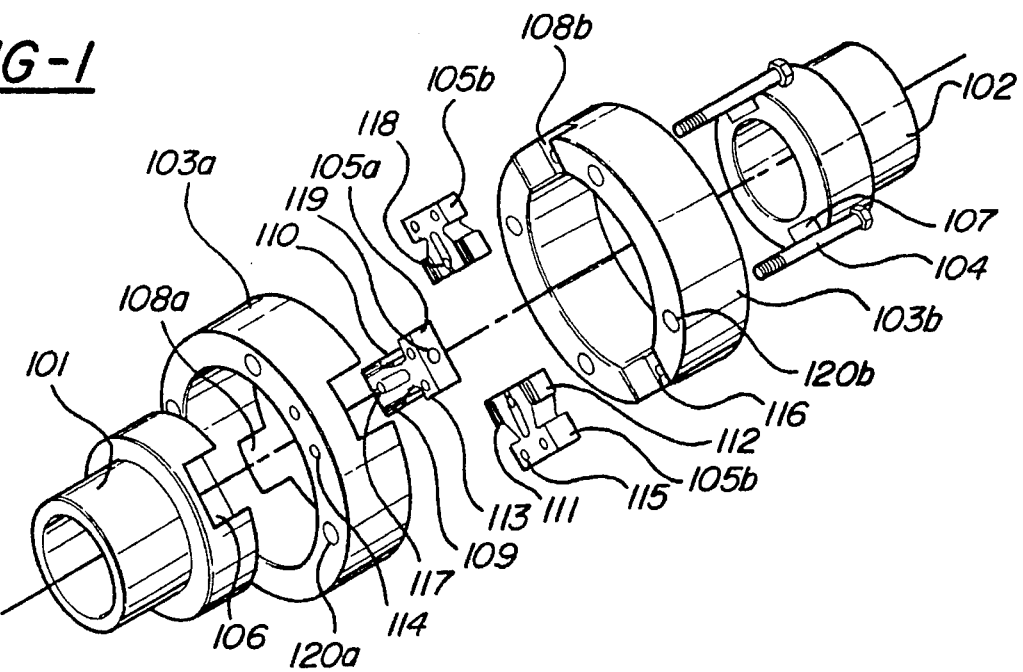
FIG. 1 is an exploded perspective view of one embodiment of the proposed invention.

Throughout the following detailed description, like reference numerals are used to refer to the same element of the present invention shown in multiple embodiments thereof, with two last digits in the numeral designating the element, and the first digit designating the sequential number of FIGURE.

Figure 3:
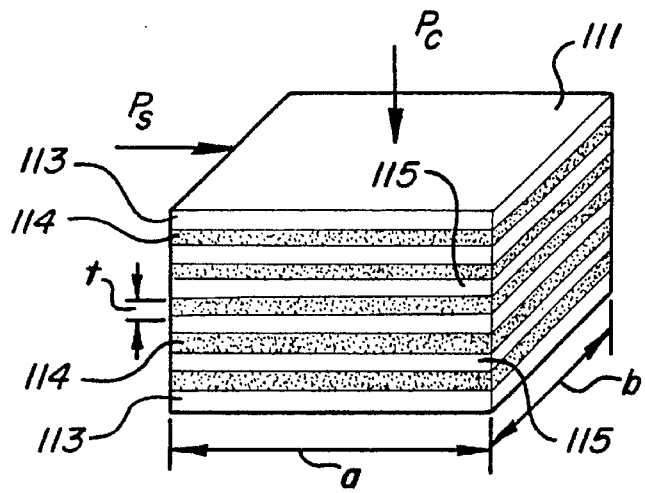
FIG. 3 is an axonometric drawing of a laminated element.

FIG. 1 illustrates the proposed torsional connection. Hubs 101 and 102 are attached to the connected shafts by known means. Intermediate member 103 consists of two identical halves 103a and and 103b which are connected by known means, e.g. by fasteners 104 passing through holes 120a, 120b, and each having a pair of diametrically located slots 108a and 108b, respectively, for accomodating holding structures 105a, 105b, respectively. Holding structures 105a, 105b are equipped with identical laminated elements 109 and 110 (105a), and 111 and 112 (105b). The structure of the laminated elements is explained below (FIG. 3). Holding structures 105a, 105b are attached to respective halves 103a, 103b of intermediate member 103 using known fasteners passing through holes 113, 114 and 115, 116, respectively. The other ends of holding structures 105a with attached laminated elements 109 and 110 are fit into diametrically located slots 106 in hub 101, while the other ends of holding elements 105b with attached laminated elements 111, 112 are fit into diametrically located slots 107 in hub 102. Preloading rollers 117, 118 are inserted into holding structures 105a, 105b, respectively.

Figure 2:
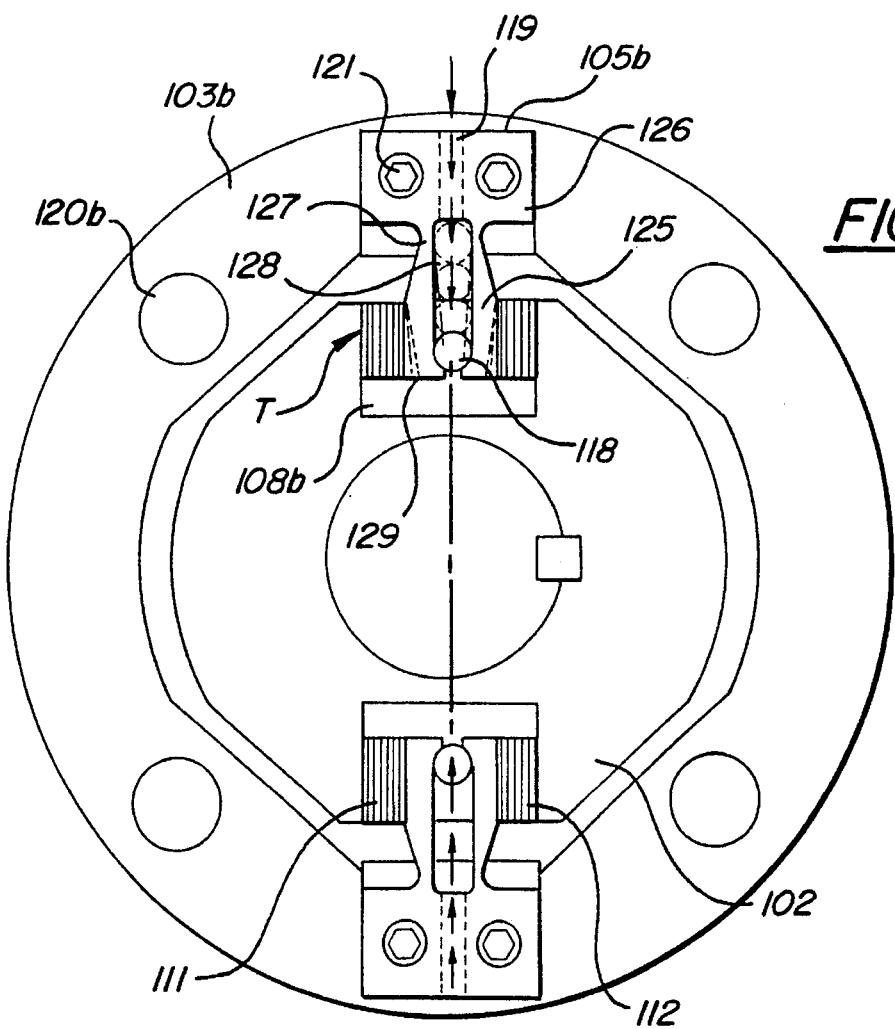
FIG. 2 is an axial direction view at the interface between one hub and the intermediate member of the proposed torsional connection showing the preloading process for the laminated elements.

FIG. 2 shows a face view of the assembled right half of intermediate member 103b attached to right hub 102 via two pairs of identical laminated elements 111, 112 which are supported by holding structures 105b, which are fastened by known means, e.g. by fasteners 121 to intermediate member 103b. Each forklike holding structure 105b has two prongs 125 connected with base 126 of holding structure by elastic hinge 127.

In the unstressed condition (before the assembly) the prongs are inwardly inclined as illustrated by broken lines at the top of FIG. 2. Such configuration allows to easily insert holding structure 105b with two laminated elements 111, 112 into slot 108b of hub 102. After both holding structures 105b with the attached laminated elements 111 and 112 are inserted in slots 108b, loading rollers 118 are inserted in the wide area of slots 128 of holding elements 105b (as shown by dotted lines at the top of FIG. 2). After insertion of loading rollers 118, they're pushed by known means (e.g., by a pin driven by a hammer through holes 119) as shown by arrows at the top of FIG. 2, until they are stopped by protrusions 129 at the end of prongs 125. Dimensions of holding structures 105b and of laminated elements 111 and 112 are designed in such a way, that at this moment the outer surfaces of prongs 125 are approximately parallel and laminated elements 111, 112 are subjected to a specified compression (preload).

While elastic deformation of prongs 125 is associated with relatively low resistance to displacement of driving roller 118, holding structures 105b are "closed" and reinforced by rollers 118 in their terminal positions when they are contacting protrusions 129. The "closed" holding structures 105b are many times stiffer and stronger when subjected to torque transmission from or to hubs. A case of driving hub 102 transmitting torque T in the direction of arrow is presented in FIG. 2. Holding structure 105b is resisting this torque (represented by a tangential force acting through laminated elements 111, 112 to prongs 125) as a frame represented by its base 126, prongs 125, and roller 118 which ties prongs by friction forces. The friction forces can be reinforced by an appropriate surface treatment at the contact of roller 118 with prongs 125, or by adhesives, solder, or by other known techniques.

FIG. 3 illustrates design of laminated element 311. The element is a bonded together assembly of alternating flat layers of rigid material (metal, fiber-reinforced composite, etc.) 113, 115, and of elastomeric (rubber-like) material 114. End (cover) layers 113 are usually thicker than intermediate layers 115. Thickness of end layers 113 should provide for interfacing with other design components, for accomodating fasteners, etc. Thickness of identical elastomeric layers 114 is preferably within a range t=0.002–0.040 in., and ratios a/t, b/t=10–200. Width a and length b of elastomeric layers 114 are indicated in FIG. 3. Bonding between rigid and elastomeric layers is provided by known techniques.

Elastomers are known to be volumetric-incompressible materials, which is indicated by their Poisson's ratios being very close to 0.5. As a result, compression of laminated element 111 by a force $P_c$ would cause only relatively small deformations of the elastomeric layers, to the extent of bulging of their side (free) surfaces, since volume of the bulges should be equal to the volume displaced by the compressive deformation of the layers. With thicker layers (larger t) volume of the bulges is increasing; with smaller dimensions a, b the volume displaced by compressive deformation is decreasing. Thus, thicker and/or smaller layers exhibit higher degree of compressive deformation. With given a, b, and the total thickness of elastomeric layers in a laminated element, the compression stiffness will be fast increasing with decreasing thickness of individual layers.

On the other hand, shear deformation of laminated element 111 under shear force Ps does not depend on the number of the elastomeric layers, only on their total thickness, since shear deformation is not associated with a volume change. As a result, the ratio of compression stiffness to shear stiffness of laminated elements with thin elastomeric layers, can be very high (up to 1,000–3,000), e.g. see cited above article in Tribology International. It is also shown in this reference, that the thin-layered laminates demonstrate very high strength in the compression direction. They can tolerate compressive pressures as high as 45,000 psi; recent studies have shown even higher allowable pressures. An important property of the thin-layered laminates is a very slight dependence of their shear resistance on the magnitude of applied compression force-a ten-fold increase in the compression force causes only about 15% increase in the shear resistance. Contrary to this, motion resistance (friction force)-or frictional connections, is proportional to the applied compression force. Another interesting feature of thin-layered laminates is nonlinearity of their compression stiffness-a hundred-fold increase in compression force leads to about ten-fold increase in compression stiffness.

Accordingly, preloading of the laminated elements in the design shown in FIGS. 1, 2 (compressing of all laminated elements 109, 110, 111, 112 in FIG. 1, 111 and 112 in FIG. 2 when the torsional connection is not transmitting any torque) would completely eliminate backlashes in the system, while would not noticeably increase the shear force resisting mutual displacements between hubs and intermediate member which are caused by an offset misalignment of the connected shafts. The effective torsional stiffness of the torsional connection in FIGS. 1, 2 is determined by compression stiffness of laminated elements 109, 110, 111, 112 in FIG. 1, or 111 and 112 for one-half of the torsional connection in FIG. 2, and also by deformations of holding structures 105 in FIG. 1 or 105 in FIG. 2. Stiffness of holding structures is relatively low for preloading of laminated elements (it is equivalent to bending stiffness of individual prongs 125 in FIG. 2 which have easily deforming hinge areas 127). This allows to perform preloading of laminated elements without a need to apply excessive force. On the other hand, the holding structure is resisting to the tangential forces as a closed frame having many times higher stiffness than stiffness of individual prongs.

Figure 4:
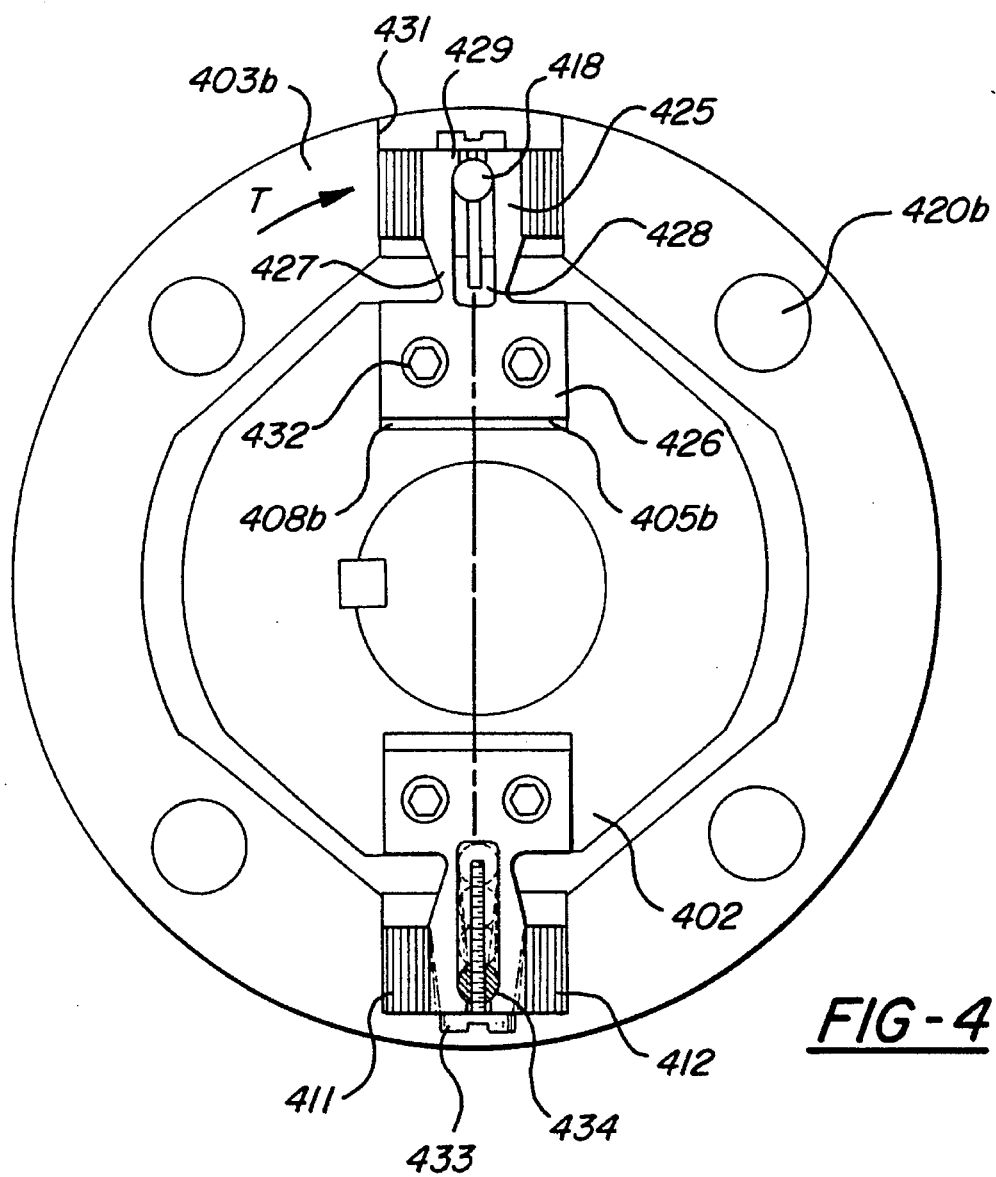
FIG. 4 is an axial direction view at the interface between one hub and the intermediate member of another embodiment of the proposed torsional connection.

FIG. 4 illustrates another embodiment of torsional connection per present invention. Hub 402 is interfaced with intermediate member 403b via two pairs of laminated elements 411, 412 which are supported by holding structures 405b. In this embodiment, base 426 of holding structure 405b is rigidly attached (e.g., by known fasteners 432) to slot 408b of hub 402, while laminated elements 411, 412 are placed between prongs 425 of holding structure 405b and slots 431 of intermediate member 403b. Preloading of laminated elements 411, 412 is effected by moving loading blocks (rollers) 418 having threaded holes 434 with which preloading screws 433 are engaging. By driving from outside preloading screws 433, which are initially engaged with inserted loading blocks 418, blocks 418 are forced to move towards ends of prongs 425, thus pushing prongs outward and preloading laminated elements.

While the preloading system in FIGS. 1, 2 is simple since it does not contain preloading screws, and hubs have simpler design, system in FIG. 4 has laminated elements 411, 412 located farther from the connection axis. Thus, for a given transmitted torque T, tangential force acting on laminated elements and on holding structures would have a smaller magnitude, thus enhancing safety margin and/or torque-carrying capacity of the connection. Also, it is known that equivalent torsional stiffness of a resilient element is proportional to square of its distance from the rotational axis. Thus, embodiment in FIG. 4 is significantly stiffer in torsional direction than embodiment in FIGS. 1, 2 of the similar size. Yet another advantage of this embodiment is action of the head of preloading screw 433. When the screw is being tightened at the end of the preloading procedure, high friction forces are developing between holding structure and head of preloading screw, thus further reinforcing the closed structure of the frame.

Figure 5:
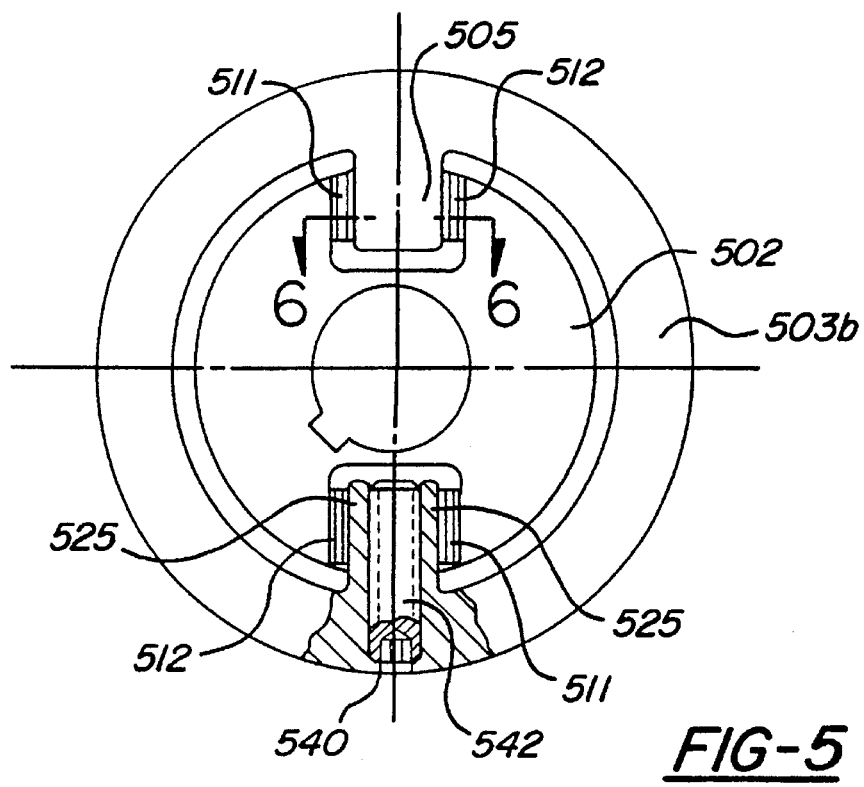
FIG. 5 is an axial direction view at the interface between one hub and the intermediate member of yet another embodiment of the proposed torsional connection.
Figure 6:
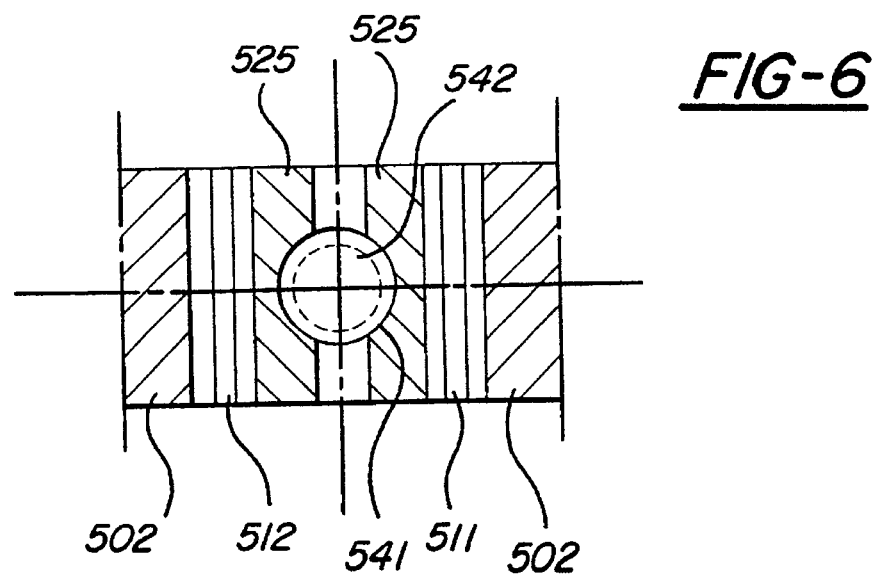
FIG. 6 is a cross section of FIG. 5 by plane 1—1.

Yet another embodiment of the proposed invention is shown in FIG. 5. Hub 502 is connected to intermediate member 503b via laminated elements 511 and 512. Holding structures 505 are made integral with intermediate member 503b. Each holding structure 505 has preloading prongs 525 machined from the same blank as the whole (or the half) of intermediate member. It is shown in a section in the bottom part of FIG. 5. Inside area of prongs 525 is threaded as it is shown in FIG. 6 (thread 541). This threaded area continues as threaded hole 540 in the body of intermediate member 503b.

Prongs 525 before assembly are not parallel but slightly converge towards the ends. During the threading operation, prongs 525 are kept deformed such that they are parallel (which is their final position after preloading of laminated elements 511, 512). After the thread is cut through hole 540 and through intraprong space, prongs 525 are released and return to their original converging configuration. This configuration allows for easy insertion of laminated elements 511, 512 during assembly of the connection. After assembly, threaded preloading elements 542 are screwed in, first through holes 540 and then through threaded surfaces of prongs 525. During the latter part of the operation, threaded preloading element 542 is forcefully pushing prongs 525 outward thus providing preloading of laminated elements 511 and 512. After preloading, prongs 525 of the holding structure, preloading element 542, and base of intermediate member 503*b* form an extremely stiff and strong integrated structure thus assuring high torsional stiffness and payload capacity of the connection.

It is obvious, that prongs 525 can be made as integral part of hub 502 instead of being made as integral part of intermediate member 503*b*.

It is readily apparent that the components of the torsional connection disclosed herein may take a variety of configurations. Thus, the embodiments and exemplifications shown and described herein are meant for illustrative purposes only and are not intended to limit the scope of the present invention, the true scope of which is limited solely by the claims appended hereto.

I claim:

1. Torsional connection for mechanical power transmission comprising two nominally coaxial hubs and an intermediate member nominally coaxial with said hubs, each of said hubs connected with said intermediate member via pairs of parallel preloaded in compression laminated elements comprising alternating bonded together layers of elastomeric material and rigid material, with compression load on one of said laminated elements in each pair increasing while compression load on the other laminated element in the same pair decreasing with increasing torque transmitted by said torsional connection, wherein said laminated elements comprising each pair are located on opposite sides of a fork-like holding structure including two prongs, and preloading of said elastomeric elements is effected by said prongs being elastically expanded outwardly in relation to said holding structure by means of a preload-generating element in order to develop a specified compression preload of said laminated elements, with said holding structure constituting together with said preload—generating element in its terminal position a closed frame thus providing rigidity for torque transmission via compression of said laminated elements.

2. Torsional connection of claim 1 wherein said holding structure has an internal space between said prongs, said space narrowing towards free ends of said prongs, and said preload generating element is a solid block inserted into the wider part of said internal space between said prongs of said holding structure, and said block is driven towards free ends of said prongs thus spreading them apart and creating desired compression preload of said elastomeric elements.

3. Torsional connection of claim 2 wherein said blocks are shaped as rollers.

4. Torsional connection of claim 3 wherein said rollers are driven within said holding structures by screws engaged with threaded holes in said rollers.

5. Torsional connection of claim 2 wherein said preload generating element is shaped as a threaded screw engaged with threaded internal space between said prongs.

6. Torsional connection of claim 1 wherein said holding structures are fastened to said intermediate member.

7. Torsional connection of claim 1 wherein said holding structures are fastened to said hubs.

8. Torsional connection of claim 1 wherein said holding structures are integral with said intermediate member.

9. Torsional connection of claim 1 wherein said holding structures are integral with said hubs.

10. Torsional connection of claim 1 wherein said intermediate member comprises two axially separated halves.

\* \* \* \* \*